(12) United States Patent
Klem

(10) Patent No.: US 11,279,604 B1
(45) Date of Patent: Mar. 22, 2022

(54) REMOVABLY ATTACHABLE CLAMP DEVICE

(71) Applicant: Dennis Klem, Rochester, NY (US)

(72) Inventor: Dennis Klem, Rochester, NY (US)

( * ) Notice: Subject to any disclaimer, the term of this patent is extended or adjusted under 35 U.S.C. 154(b) by 0 days.

(21) Appl. No.: 17/503,291

(22) Filed: Oct. 16, 2021

(51) Int. Cl.
    *B67B 7/14*     (2006.01)
    *F16B 47/00*     (2006.01)

(52) U.S. Cl.
    CPC .............. *B67B 7/14* (2013.01); *F16B 47/00* (2013.01)

(58) Field of Classification Search
    CPC ... B67B 7/14; B67B 7/18; F16B 47/00; B25B 13/5058; B25B 5/068; B25B 5/003
    USPC ............................... 81/3.32, 3.4–4.33; 269/3
    See application file for complete search history.

(56) References Cited

U.S. PATENT DOCUMENTS

| | | | |
|---|---|---|---|
| 5,704,258 A | 1/1998 | LaVoie | |
| 2003/0034601 A1* | 2/2003 | Kloepfer | B25B 1/103 269/21 |
| 2003/0079568 A1 | 5/2003 | Cope | |
| 2004/0004318 A1* | 1/2004 | Degen | B25B 5/06 269/95 |
| 2017/0014975 A1* | 1/2017 | Edge | B25B 1/2457 |

FOREIGN PATENT DOCUMENTS

| | | |
|---|---|---|
| CN | 201196185 Y * | 2/2009 |
| DE | 102007015163 | 10/2008 |
| JP | 2006062693 | 3/2006 |

OTHER PUBLICATIONS

Tranlation of CN201196185Y, retrieved from Espacenet on Nov. 30, 2021 (Year: 2009).*

* cited by examiner

*Primary Examiner* — Lee D Wilson
*Assistant Examiner* — Thomas Raymond Rodgers
(74) *Attorney, Agent, or Firm* — Tracy Jong Law Firm; Tracy P. Jong; Cheng Ning Jong

(57) ABSTRACT

A clamp device for securing an object, the clamp device including an attachment device configured for attachment to a flat surface in a first direction; and a trigger clamp including a pair of adjustable jaws adjustable in a second direction and an actuation mechanism of the pair of adjustable jaws including both a lock function and an unlock function and an adjustment structure for adjusting a space encompassed within the pair of adjustable jaws, wherein the trigger clamp is coupled to the attachment device, the actuation mechanism is configured to be operated with only one action with only one hand of a user while the trigger clamp is coupled to the attachment device to secure the object in the space and the second direction is disposed substantially at a right angle to the first direction.

9 Claims, 7 Drawing Sheets

REMOVABLY ATTACHABLE CLAMP DEVICE

BACKGROUND OF THE INVENTION

1. The Field of the Invention

The present invention relates to a clamp device useful for securing a container or jar for its lid to be removed with a one-handed operation. More specifically, the present invention is directed to a clamp device useful for securing one of a wide range of containers or jars for its lid to be removed with a one-handed operation and to secure the container or jar for the contents to be removed.

2. Background Art

In modern living, various prepared materials including food and drinks are preserved or stored in jars or other types of containers. The containers are often sealed with screw-type caps and pull-tabs, etc., to protect the contents of the containers. To access the contents of the containers, an individual with two hands can hold a container in one hand while using another hand to remove the cap or lid such that the contents of the container become accessible. Various types of jar cap wrenches or clamps securable to a table edge, e.g., with one or more C-clamps are available in the marketplace to aid a two-handed individual in removing lids of a container. However, the types of devices suitable for facilitating the opening or closing of the lid of a jar are limited and are difficult to use.

U.S. Pat. No. 936,927 to McCallum (Hereinafter McCallum) discloses a device for securing fruit jars when tightening the caps thereof which is adjustable so as to be readily adapted for jars of different sizes and adapted to securely hold the same without endangering fracture thereof. Although McCallum discloses a device for securing jars of different diameters, it is silent regarding securing jars that are not round, e.g., rectangular or jars that having heights that fall below the height of the clamps. McCallum's device is useful for securing jars so that their lids can be tightened.

U.S. Pat. No. 5,704,258 to LaVoie (Hereinafter LaVoie) discloses a bottle opening device that includes a flat base member which is adapted to be secured to a counter top or the like by suction cups on an under surface of the base member. A support member is secured to an upper surface of the base member and is provided with a horizontally disposed slot extending therethrough. An elongated strap is secured at one end to the support member adjacent the slot. The strap is adapted to extend about the periphery of the bottle and pass through the slot. Upon rotation of the lid and bottle in an opening direction, the bottle will clamp the strap between the bottle and the support member to immobilize the bottle so that upon continued application of turning force to the lid, the lid will be unscrewed from the bottle. LaVoie's device may be unsuitable for jars of a shape that is not cylindrical, e.g., rectangular, e.g., square, the device may be incapable of suitable grip to immobilize the jar. In addition, the use of suction cups that are incapable of being activated or inactivated, making it harder to relocate the device.

German Pat. Pub. No. DE102007015163 to Toense (Hereinafter Toense) discloses a device for fixing containers with a twist lock during the opening of the rotary closure, which facilitates a power-saving opening. Again, Toense's device may be unsuitable for jars of a shape that is not cylindrical, e.g., rectangular, e.g., square, the device may be incapable of suitable grip to immobilize the jar. However, Toense discloses a device including two suction cups capable of being activated or inactivated, making it easier to relocate the device.

Japanese Pat. Pub. No. 2006062693 to Katsuhisa (Hereinafter Katsuhisa) discloses a device for easily opening and closing the lid of a container with a lid with one hand. When a lid of a lidded container having a container body having an opening and a lid screwed into the opening of the container body by screw means is used, one end side is a support. The cable body that is supported by and can be wound around the container body, and the cable body provided at the other end of the cable body is interposed between the container body and the container body, and the container body is rubbed. The engaging member is configured by a roller that rolls on the container body, and the roller is rotatably provided at the other end of the cable body. The elastic member elastically contacting the container main body is provided. Katsuhisa's device again takes advantage of an adjustable strap configured to be secured around a container. Note also that, in various embodiments, instead of using suction cups for securing a container, Katsuhisa's device involves the use of a strap looped at one end and a clamp configured to be secured to a table edge.

U.S. Pat. Pub. No. 20030079568 of Cope (Hereinafter Cope) discloses a bottle and jar lid opener suitable for single hand operation. The opener includes a jar gripping assembly to restrain the jar which has a band tightened by lengthening or shortening the band to engage the band about the body to secure the jar to said band support and base. A wrench also includes a band of material forming a loop tightened about the lid. Rotation of the wrench tightens the band. Any movement of the jar in response to torque applied to the lid for opening thereof causes the jar to roll along a support leading surface to further tighten the band. Cope discloses an activatable suction cup although its mechanism for securing a container is cumbersome to use.

There exists a need for a clamp device that is easy to use for a one-handed individual, a clamp device that is easy to be relocated, a clamp device that be used to swiftly lock or unlock a jar to be manipulated quickly and without undue effort.

SUMMARY OF THE INVENTION

In accordance with the present invention, there is provided a clamp device for securing an object, the clamp device including:

(a) an attachment device configured for attachment to a flat surface in a first direction;

(b) a clamp including a pair of adjustable jaws adjustable in a second direction and an actuation mechanism of the pair of adjustable jaws including both a lock function and an unlock function and an adjustment structure for adjusting a space encompassed within the pair of adjustable jaws, wherein the clamp is coupled to the attachment device and the pair of adjustable jaws is disposed such that a top edge of the pair of jaws is disposed at a first level, the actuation mechanism is configured to be operated with only one action with only one hand of a user while the clamp is coupled to the attachment device to secure the object in the space and the second direction is disposed substantially at a right angle to the first direction; and (c) a block for selectively raising a supporting surface upon which the object is support, wherein the block is configured to be selectively used to raise the object to expose a lid of the object above the first level such that the lid of the object can be manipulated.

In one embodiment, the pair of jaws includes a pair of substantially flat plates. In one embodiment, the pair of substantially flat plates include teeth to provide an enhanced grip when the pair of jaws are closed against the object. In one embodiment, the pair of jaws includes a vertical height of the top edge of the pair of jaws with respect to the supporting surface is no more than about 3 inches. In one embodiment, the clamp is a trigger clamp. In one embodiment, the attachment includes a suction cup. In one embodiment, the suction cup is an activatable suction cup. In one embodiment, the suction cup includes a tab configured to aid in releasing the suction cup upon its actuation. In one embodiment, a maximum spread of the space is about 6 inches. In one embodiment, the block includes a height and a width, the height of the block is about 1 inch and the width of the block is about 3 inches. In one embodiment, each of the pair of jaws includes a length, the clamp device further includes a pair of extension arms each extension arm is configured to extend the length of each of the pair of jaws.

An object of the present invention is to provide a device for securing containers of a wide range of sizes while allowing their respective lids to be accessible to a user's hand or a tool for removal.

Another object of the present invention is to provide a clamp having jaws that can be tightened with one action exerted using one hand.

Another object of the present invention is to provide a clamp having jaws that can be narrowed with one action exerted using one hand.

Another object of the present invention is to provide a clamp having jaws that can be widened with one action exerted using one hand.

Whereas there may be many embodiments of the present invention, each embodiment may meet one or more of the foregoing recited objects in any combination. It is not intended that each embodiment will necessarily meet each objective. Thus, having broadly outlined the more important features of the present invention in order that the detailed description thereof may be better understood, and that the present contribution to the art may be better appreciated, there are, of course, additional features of the present invention that will be described herein and will form a part of the subject matter of this specification.

BRIEF DESCRIPTION OF THE DRAWINGS

In order that the manner in which the above-recited and other advantages and objects of the invention are obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

PARTS LIST

2—clamp device
4—clamp
6—attachment device
8—base block
10—support block
12—container or jar
14—container lid or jar lid
16—jaw of clamp
18—supporting surface
20—jaw widening trigger lever
22—jaw widening trigger lever leverage
24—jaw narrowing trigger lever
26—jaw narrowing trigger lever leverage
28—bar
30—jaw widening direction
32—jaw narrowing direction
34—spread
36—depth of spread or space
38—height of block
40—width of block
42—line representing substantially flat surface
44—teeth
46—extension arm
48—actuation arm of suction cup
50—right hand
52—vertical height of top edge of jaws with respect to supporting surface
54—tab
56—jaw widening trigger lever leverage

PARTICULAR ADVANTAGES OF THE INVENTION

Compared to strap clamps or clamps having grip surfaces which cannot be adjusted merely at the squeeze of a trigger, the present clamp device offers a way to easily secure or release a container with the use of only one hand. Further, the present clamp device is useful for securing containers of a wide range of sizes with only one hand while conventional clamp devices are only useful for use with a narrow range of container sizes. The present clamp device is simple to operate with one hand, is not motorized and does not require any form of power but human power to operate.

DETAILED DESCRIPTION OF A PREFERRED EMBODIMENT

The term "about" is used herein to mean approximately, roughly, around, or in the region of. When the term "about" is used in conjunction with a numerical range, it modifies that range by extending the boundaries above and below the numerical values set forth. In general, the term "about" is used herein to modify a numerical value above and below the stated value by a variance of 20 percent up or down (higher or lower).

Disclosed herein is essentially a device for aiding the removal of a jar/container cap/lid with only one hand, e.g., by a stroke victim or an amputee, by securing the container such that the person can apply torque to the lid to have it removed. The clamp is disposed on base blocks 18 each capable to be attached to a flat supporting surface with a suction cup capable of being activated and attached to the flat supporting surface or deactivated and released from the flat supporting surface.

Figure 1:
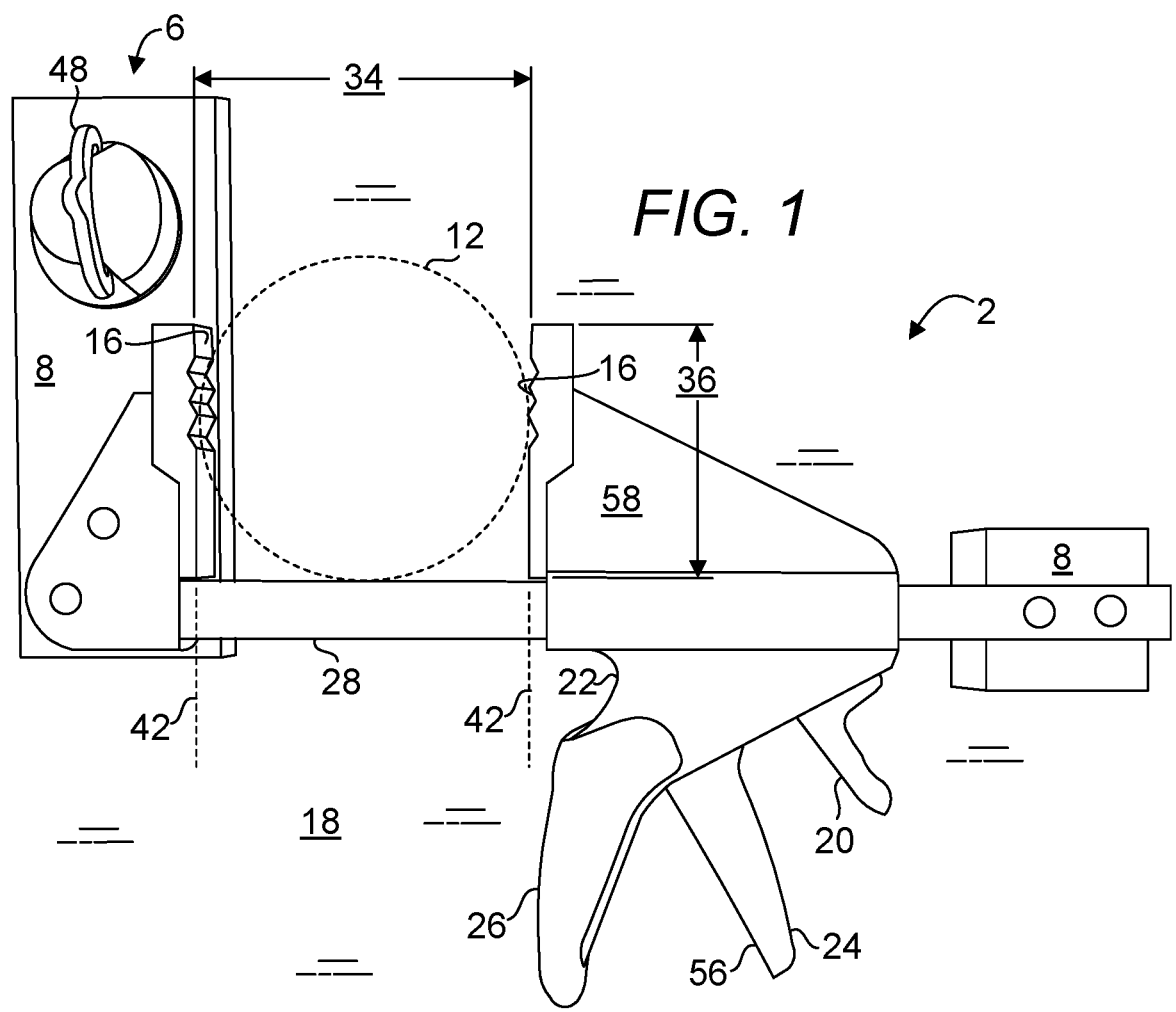
FIG. 1 is a top perspective view of a clamp device.
Figure 2:
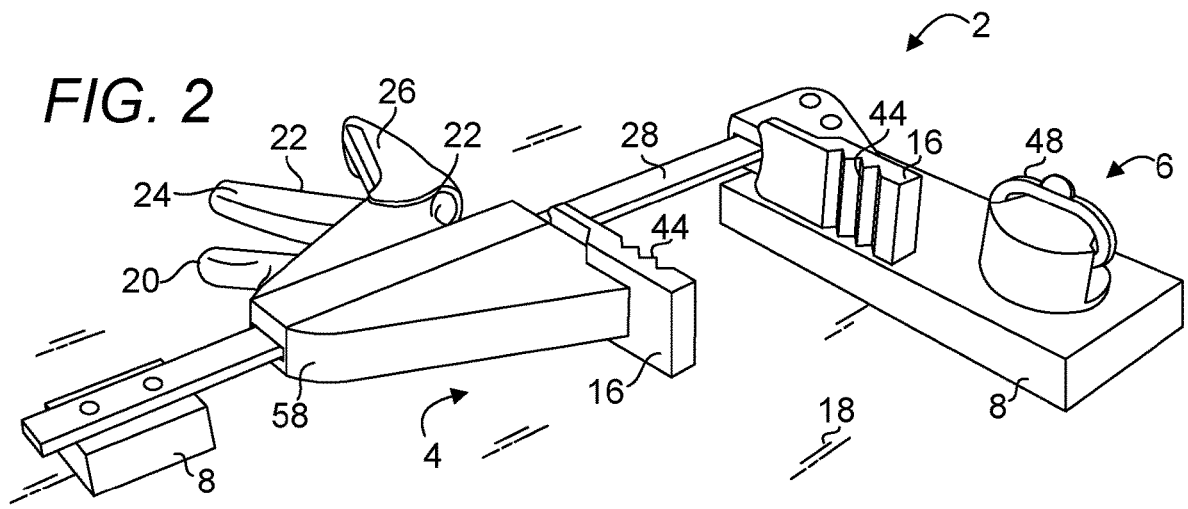
FIG. 2 is a top front perspective view of a clamp device.
Figure 3:
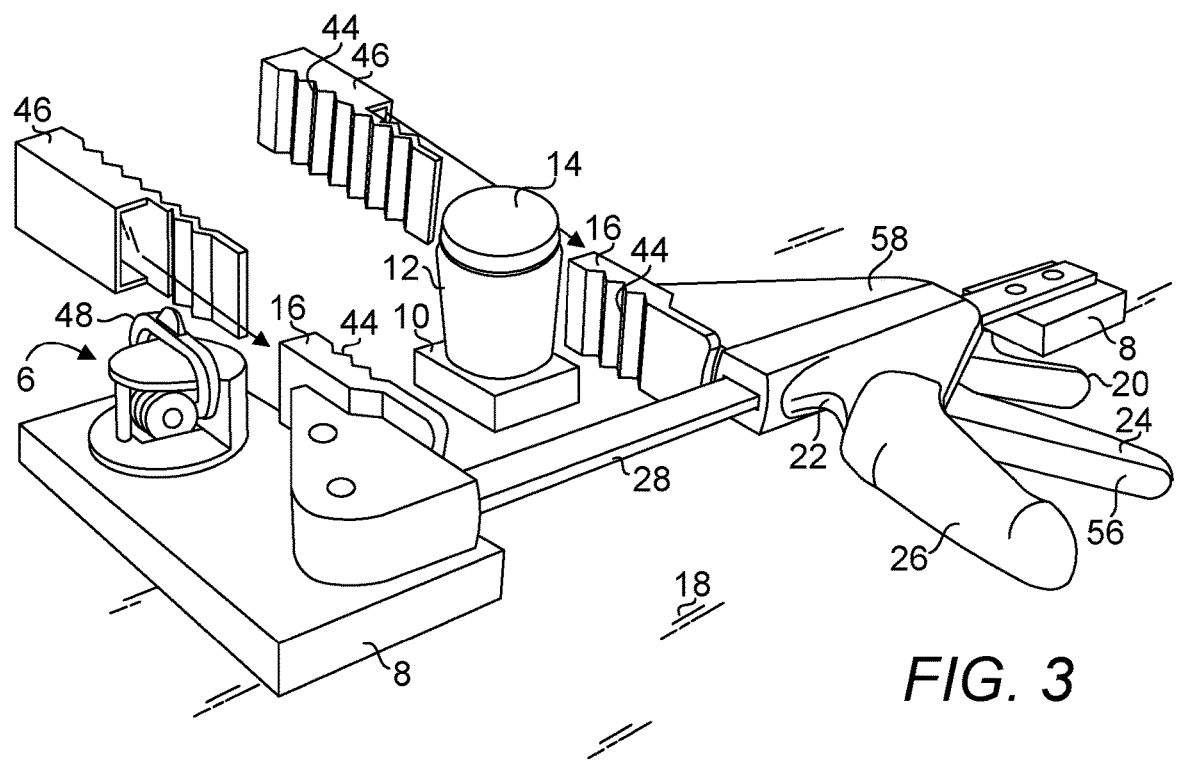
FIG. 3 is a top rear perspective view of a clamp device.
Figure 4:
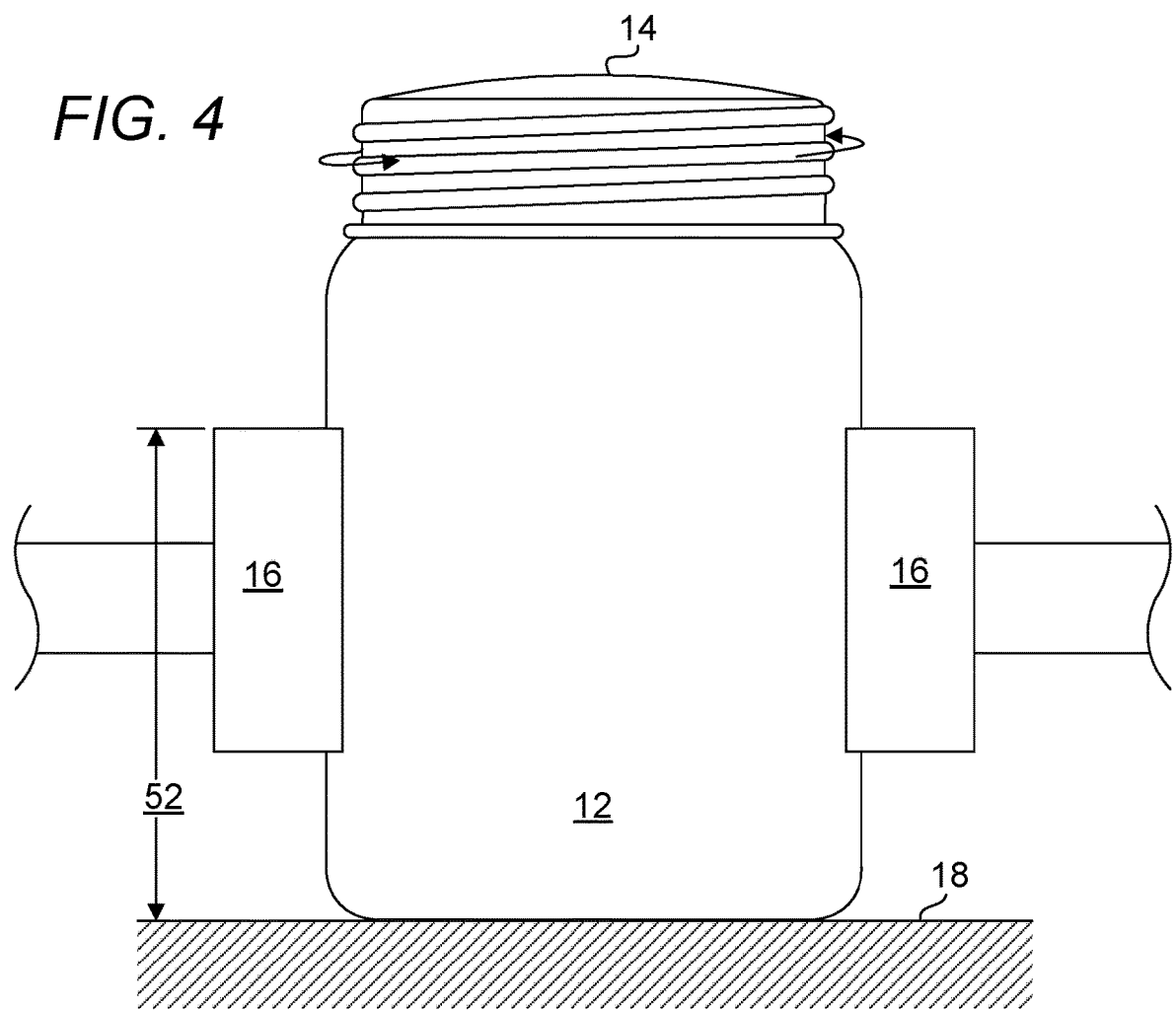
FIG. 4 is a partial front view of a clamp device, depicting a manner in which a container is secured.

FIG. 1 is a top perspective view of a clamp device 2 for securing an object. FIG. 2 is a top front perspective view of a clamp device 2 for securing an object. FIG. 3 is a top rear perspective view of a clamp device 2 for securing an object. FIG. 4 is a partial front view of a clamp device 2, depicting a manner in which a container 12 is secured and immobilized. The clamp device 2 includes an attachment device 6, a clamp 4 and a block 10. The attachment device 6 is configured for attachment to a flat surface, e.g., table top, in a first direction. The clamp 4 includes a pair of adjustable jaws 16, adjustable in a second direction and an actuation mechanism of the pair of adjustable jaws 16 including both a lock function and an unlock function and an adjustment structure for adjusting a space encompassed within the pair of adjustable jaws. One of the jaws 16 is attached to a bar 28 while the other 16 is attached to an adjustment mechanism 58 configured to slide along the bar while adjustment of the position of the jaw 16 of the adjustment mechanism 58 is made. The clamp 4 is coupled to the attachment device 6 and the pair of adjustable jaws 16 is disposed such that a top edge of the pair of jaws 16 is disposed at a first level. The actuation mechanism is configured to be operated with only one action with only one hand of a user while the clamp is coupled to the attachment device 6 to secure the object 12 in the space and the second direction is disposed substantially at a right angle to the first direction. The support block 10 is useful for raising a supporting surface 18 and is configured to be selectively used to raise the object 12 to expose a lid of the object above the first level such that the lid 14 of the object 12 can be manipulated. The lid 14 can be a screw-type lid where a torque useful for opening the jar 12 is applied in a plane substantially perpendicular to the force applied to the attachment device 6 to attach the clamp device 2 to the supporting surface 18. As shown herein, base blocks 8 are used for supporting each end of the clamp 4 and for providing a base upon through which the attachment device 6 is secured. The base blocks 8 may be formed integrally with the clamp 4 and the attachment device 6. In one embodiment, the attachment device 6 includes one and only suction cup 6 although more than one suction cups 6 can be used to secure the clamp more securely to the supporting surface if desired. As a user who requires a present device only has one hand, it is significantly easier for a one-handed individual to move the present device from one location for use at another location. The suction cup 6 shown herein includes a bottom surface configured to interface with and removably attached to the supporting surface 18. Although not required, the suction cup 6 shown herein includes an actuation arm 48 useful for attaching the suction cup 6 to the supporting surface 18 or for releasing the suction cup 6 from the supporting surface 18. In the embodiment shown in FIGS. 1, 2, 3, 7, 8 and 10, the suction cup 6 is an activatable suction cup. In other words, the successful operation of the suction cup can be confirmed as the state change of the suction cup from a relaxed state to a deployed state can be ascertained using an actuation arm 48. In one state, the actuation arm causes a vacuum to form between a cup of the suction cup and the supporting surface 18 which causes the suction cup to be pressed against the supporting surface 18. In another state, the actuation arm causes the suction cup to be incapable of forming a vacuum with the supporting surface 18, thereby releasing the suction cup from the supporting surface 18. In one embodiment, the depth 36 of the spread provided by the jaws is about 2 inches. In addition to securing a container or a jar for its lid to be removed, the present clamp device is also useful for securing the container or jar such that its contents can be removed.

In one embodiment, the pair of jaws includes a pair of substantially flat plates. Dashed lines 42 represent the surface contours of the two jaws 16 and they are substantially parallel. As long as there is sufficient grip, e.g., provided by a plurality of teeth 44 on the flat surfaces, an object disposed within the space encompassed by the jaws 16 can be held firmly. The flat surfaces allow cylindrical objects of a wide range of sizes to be disposed and held firmly in the space. Referring to FIG. 3, each of the pair of jaws 16 includes a length, the clamp device further includes a pair of extension arms 46 each extension arm 46 is configured to extend the length of each of the pair of jaws 16 to accommodate a larger object disposed within the space encompassed by the jaws. An extension arm is essentially a sleeve including a cavity configured to receive one end of a jaw 16 and teeth disposed on a surface that once coupled to a jaw, the extension arm includes additional teeth 44 which provide grip to the extended portions of the extension arms 46. The jaws 16 may alternatively be fabricated in lengths that encompass a space having an area that is substantially square when the jaws are disposed with maximum spread to allow the jaws to accommodate a container having symmetrically-formed container, e.g., cylindrical, square, hexagonally or octagonally-shaped container that can be held securely at maximum spread. However, for compactness, the extension arms 46 are used only as objects of larger sizes may be required to be manipulated sparingly.

In one embodiment, the flat plates include teeth 44 to provide an enhanced grip when the pair of jaws are closed against the object. Referring to FIG. 4, the pair of jaws includes a vertical height 52 of the top edge of the pair of jaws with respect to the supporting surface 18 is no more than about 3 inches. In one embodiment, a maximum spread 34 of the space is about 6 inches. In one embodiment, the clamp is a trigger clamp. A trigger clamp is a holding device which uses a trigger mechanism to adjust the jaws. In one embodiment, there are two triggers one 20 for widening the space encompassed by the jaws 16 and the other 24 for narrowing the space encompassed by the jaws 16, either one of which can be operated using only one hand. In one embodiment, the block 10 includes a height and a width, the height of the block is about 1 inch and the width of the block is about 3 inches.

Figure 5:
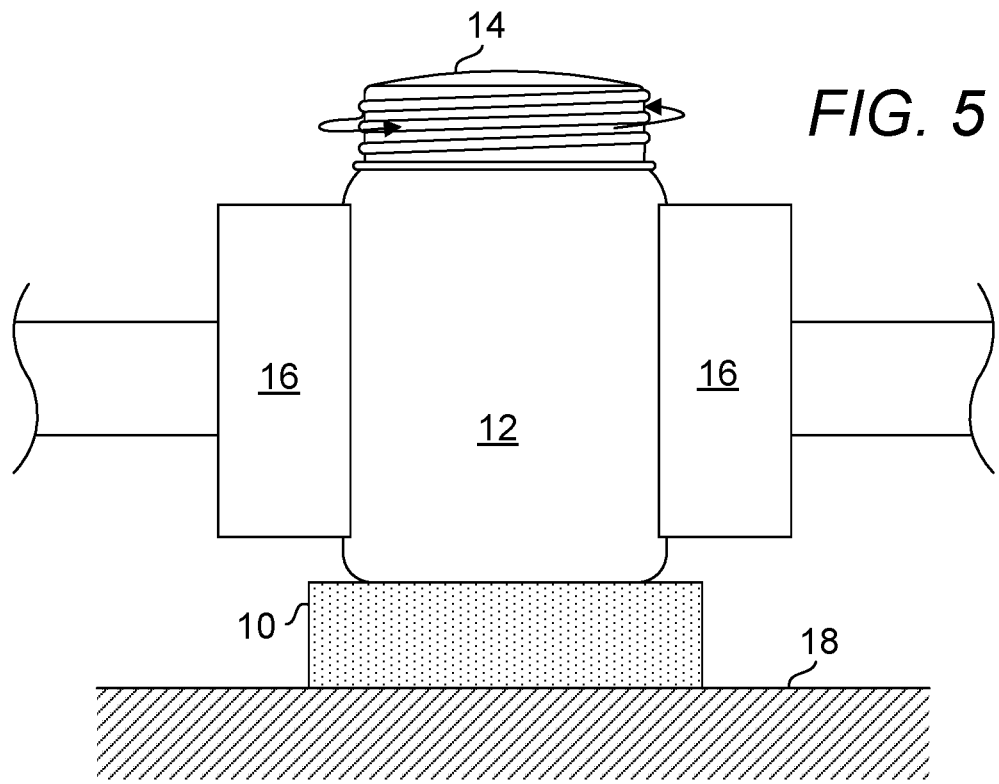
FIG. 5 is a partial front view of a clamp device, depicting a manner in which a container is secured with the aid of a supporting block.
Figure 6:
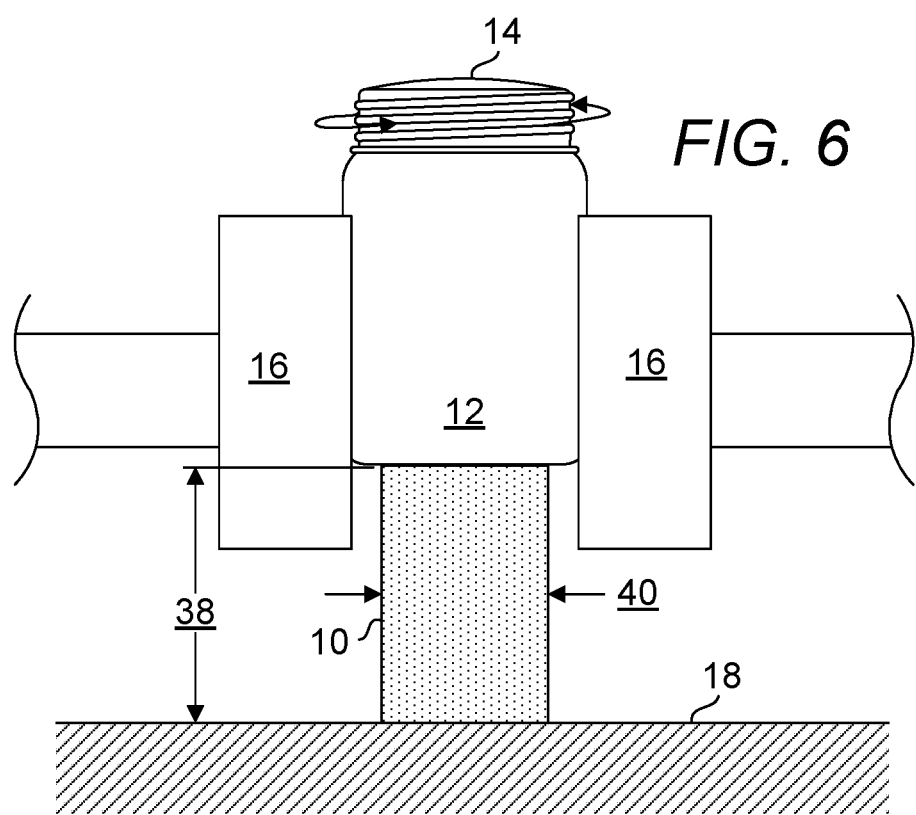
FIG. 6 is a partial front view of a clamp device, depicting a manner in which a container is secured with the aid of a supporting block.

If a container is not sufficiently tall to expose the threaded closure or lid to be worked, a narrow block is disposed at the bottom of the opening of the jaws to serve as a base for the container to increase its height while disposed within the space as shown in FIGS. 5 and 6. FIG. 5 is a partial front view of a clamp device 2, depicting a manner in which a container is secured with the aid of a supporting block 10. FIG. 6 is a partial front view of a clamp device, depicting a manner in which a container is secured with the aid of a supporting block 10. Note that by using a supporting block 10, the lid 14 of a container can be disposed in a position to be manipulated. As the user has only one hand, it is impossible to hold the jar 12 in position while manipulating the clamp to apply grip to jar 12 to keep it locked in place such that the lid can be manipulated. Therefore, for a small jar 12 as shown in FIGS. 5 and 6, a supporting block 10 must first be placed in the space between the jaws 16 before the jar 12 is seated on top of the supporting block 10. The clamp is finally manipulated to cause the jaws 16 to close in against the jar 12 and secure the jar 12 in place. For a jar having a wall that is at least as tall as the jaws 16, the supporting block 10 can be wider than the jar width. However, for a jar that needs to be raised above the top edge of the jaws for the lid to be exposed, the supporting block 10 is required to be sufficiently narrow as shown in FIG. 6 to fit into the space between the jaws 16 when the jar 12 has finally been locked in place as the jaws 16 must be capable of being closed to secure the jar 12. In one embodiment, the height 38 of the block 10 is about 1 inch and the width 40 of the block 10 is about 3 inches.

Figure 7:
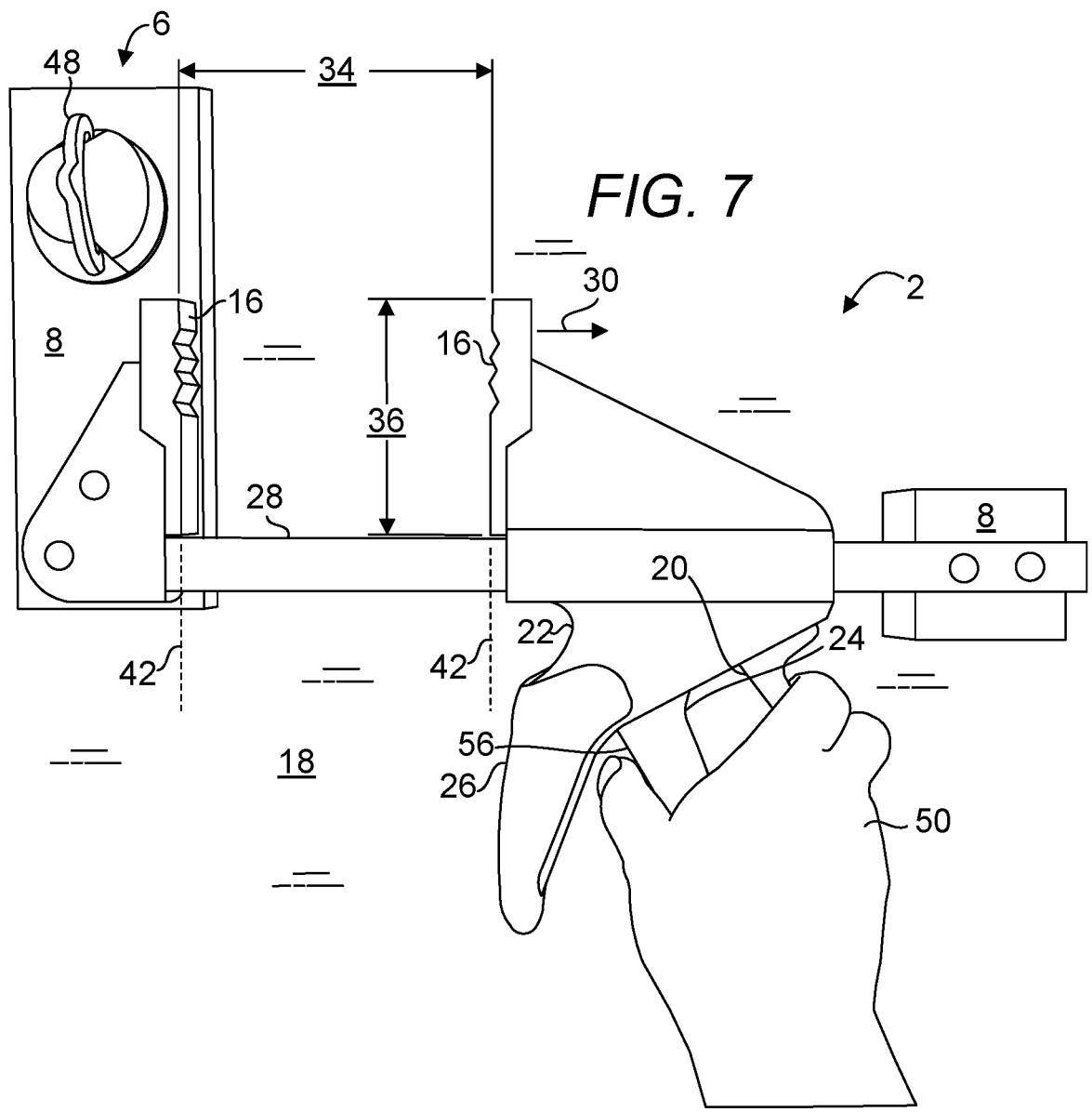
FIG. 7 is a partial top perspective view of a clamp device, depicting the spread of the clamp of the clamp device being widened.

FIG. 7 is a partial top perspective view of a clamp device, depicting the spread of the clamp of the clamp device being widened by actuating the jaw widening trigger lever 20 to provide sufficient space to accommodate a container or to release a container that had been secured in the space between the jaws 16. To "squeeze" trigger lever 20, the user may place a finger or thumb on leverage 56, leverage 22 or even leverage 26, as long as the leverage used provides a comfortable and efficient spread of the user's fingers in squeezing the lever 20 to widen the space by moving the jaw 16 attached to the adjustment mechanism 58. Each squeeze of trigger 20 causes the adjustment mechanism 58 to move a distance in direction 30 before the adjustment mechanism 58 is held or locked against the bar 28 once the squeeze on trigger 20 has been released.

Figure 8:
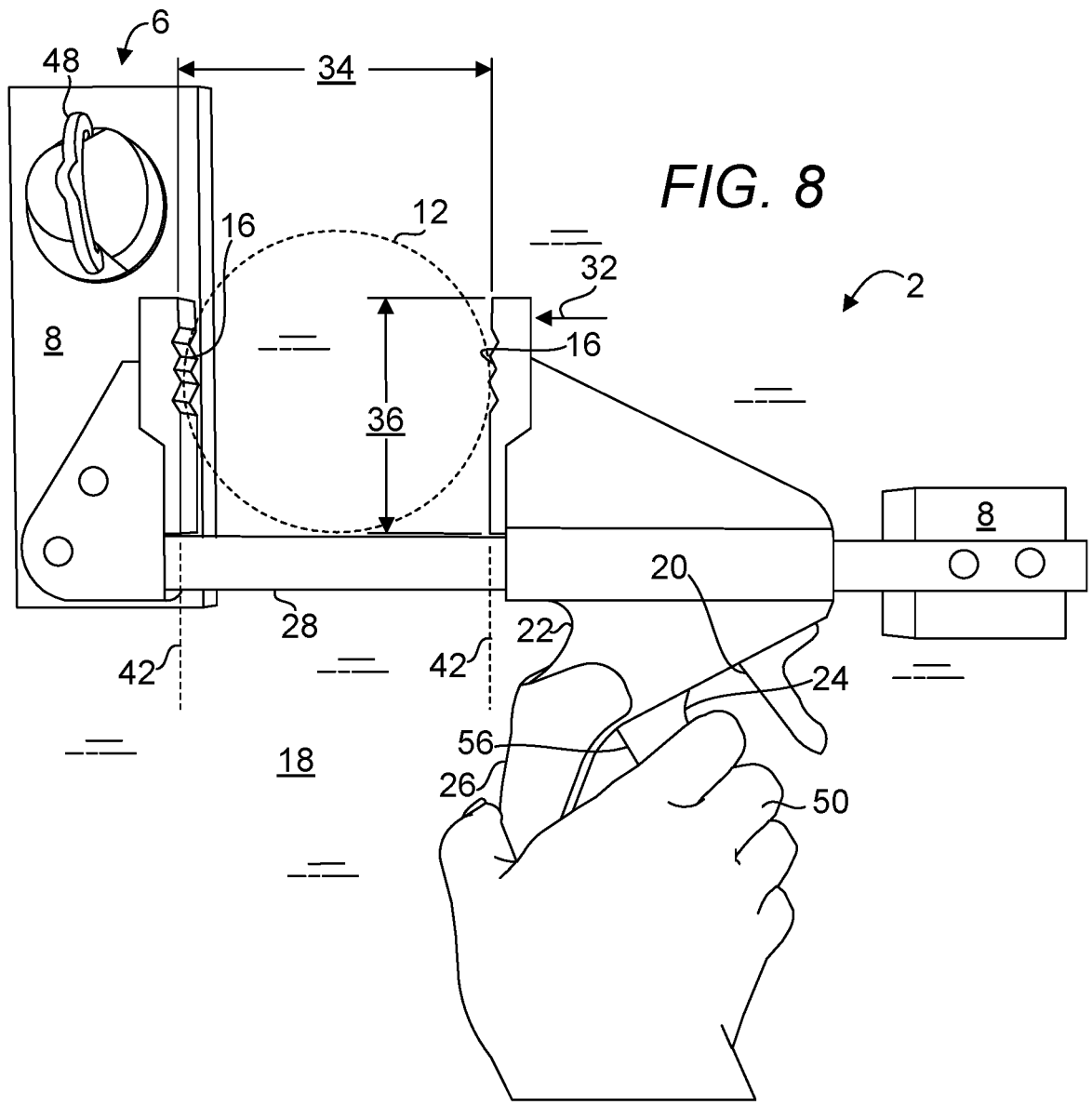
FIG. 8 is a partial top perspective view of a clamp device, depicting the spread of the clamp of the clamp device being narrowed.

FIG. 8 is a partial top perspective view of a clamp device, depicting the spread of the clamp of the clamp device being narrowed by actuating the jaw narrowing trigger lever 24 to compress the jaws 16 against a container disposed in the space and supported on either the supporting surface 18 or support block 10 to lock the container 12 in position between the jaws 16. To "squeeze" trigger lever 24, the user may place a finger or thumb on leverage 26 and the other on trigger lever 24 before squeezing them to close the jaws 16 by moving the jaw 16 attached to the adjustment mechanism 58 towards the other jaw 16. Each squeeze of trigger 24 causes the adjustment mechanism 58 to move a distance in direction 32 before the adjustment mechanism 58 is held or locked against the bar 28 once the squeeze on trigger 24 has been released. This in turn causes the jaws to press against the container 12 and secure it in the space between the jaws 16. A user can then manipulate the container secured therebetween. A right hand 50 is shown in FIGS. 7 and 8. If desired, the clamp may be configured with the triggers disposed in a manner opposite of the triggers shown in FIGS. 7 and 8 for a left handed user.

Figure 9:
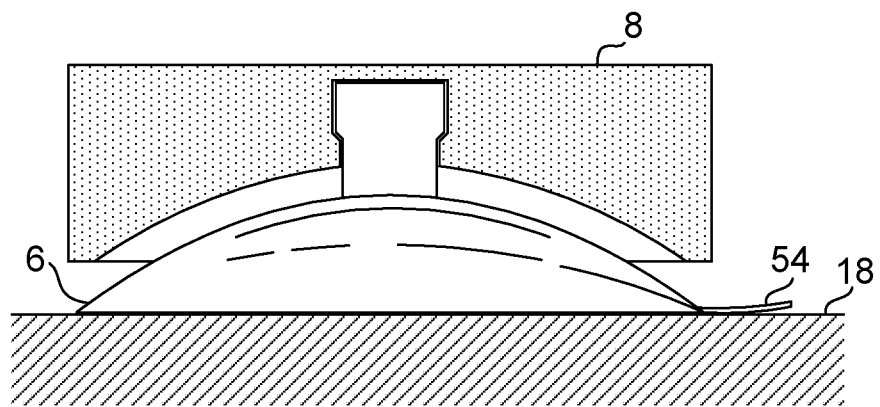
FIG. 9 depicts an alternate attachment device for securing a clamp of the present clamp device to a supporting surface.

FIG. 9 depicts an alternate attachment device for securing a clamp of the present clamp device to a supporting surface. Here, the attachment device 6 is again a suction cup but one that is simpler in construction than the one shown elsewhere herein. The suction cup does not include an actuation arm but one which includes a tab 54 to facilitate release of a base block 8 to which it is attached from the supporting surface 18 upon which the suction cup is disposed and deployed. When a suction cup having a tab is used, the tab is preferably accessible after the suction cup has been deployed.

Figure 10:
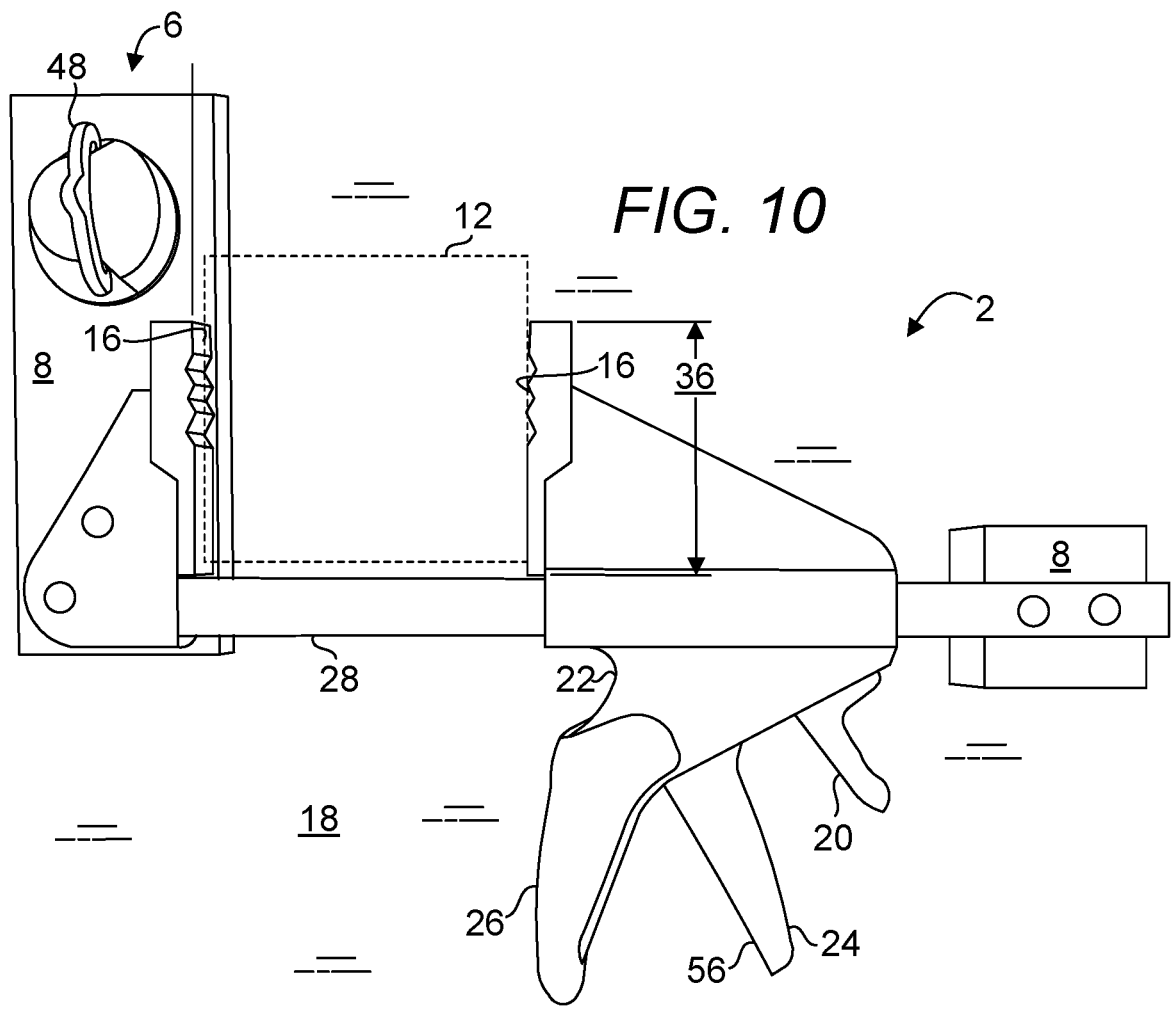
FIG. 10 is a top perspective view of a clamp device useful for securing a container that is non-cylindrical.

FIG. 10 is a top perspective view of a clamp device useful for securing a container that is non-cylindrical. Here, the outline of a square container is shown disposed within the space encompassed by the jaws 16. As the jar-contacting surfaces of the jaws are substantially flat surfaces, jars of many cross-sectional shapes can be secured using the present clamp device.

The detailed description refers to the accompanying drawings that show, by way of illustration, specific aspects and embodiments in which the present disclosed embodiments may be practiced. These embodiments are described in sufficient detail to enable those skilled in the art to practice aspects of the present invention. Other embodiments may be utilized, and changes may be made without departing from the scope of the disclosed embodiments. The various embodiments can be combined with one or more other embodiments to form new embodiments. The detailed description is, therefore, not to be taken in a limiting sense, and the scope of the present invention is defined only by the appended claims, with the full scope of equivalents to which they may be entitled. It will be appreciated by those of ordinary skill in the art that any arrangement that is calculated to achieve the same purpose may be substituted for the specific embodiments shown. This application is intended to cover any adaptations or variations of embodiments of the present invention. It is to be understood that the above description is intended to be illustrative, and not restrictive, and that the phraseology or terminology employed herein is for the purpose of description and not of limitation. Combinations of the above embodiments and other embodiments will be apparent to those of skill in the art upon studying the above description. The scope of the present disclosed embodiments includes any other applications in which embodiments of the above structures and fabrication methods are used. The scope of the embodiments should be determined with reference to the appended claims, along with the full scope of equivalents to which such claims are entitled.

What is claimed herein is:

1. A clamp system for securing a jar, said clamp system comprising:
    (a) a suction cup configured for attachment to a flat surface in a first direction;
    (b) a trigger clamp comprising a handle, a pair of adjustable jaws adjustable in a second direction, and an actuation mechanism of said pair of adjustable jaws comprising both a lock function and an unlock function and for adjusting a space encompassed within said pair of adjustable jaws for holding a body of the jar, wherein one of said pair of adjustable jaws is coupled to said suction cup and said pair of adjustable jaws is disposed such that a top edge of said pair of jaws is disposed at a first level, said actuation mechanism is configured to be operated with only one action with only one hand of a user while said clamp is coupled to said suction cup to secure the jar in said space and said second direction is disposed substantially at a right angle to said first direction; and
    (C) A block to be placed under the jar on the flat surface to move the jar from a first position at a first height to a second position at a second height, such that a lid of the jar in the second position is above said first level such that the jar can be manipulated and said pair of adjustable jaws are able to clamp and hold the body of the jar.

2. The clamp system of claim 1, wherein said pair of jaws comprises a pair of substantially flat plates.

3. The clamp system of claim 2, wherein said pair of substantially flat plates comprise teeth to provide an enhanced grip when said pair of jaws are closed against the jar.

4. The clamp system of claim 1, wherein said pair of jaws comprises a vertical height of said top edge of said pair of jaws with respect to the supporting surface is no more than about 3 inches.

5. The clamp system of claim 1, wherein said suction cup is an activatable suction cup.

6. The clamp system of claim 1, wherein said suction cup comprises a tab configured to aid in releasing said suction cup upon its actuation.

7. The clamp system of claim 1, wherein a maximum spread of said space is about 6 inches.

8. The clamp system of claim 1, wherein said block comprises a height and a width, said height of said block is about 1 inch and said width of said block is about 3 inches.

9. The clamp system of claim 1, wherein each said jaw comprises a length, said clamp device further comprises a pair of extension arms each extension arm is configured to extend the length of each said jaw.

* * * * *